April 16, 1957　　　D. A. CUSANO ET AL　　　2,789,062
TRANSPARENT FLUORIDE LUMINESCENT SCREEN
AND METHOD FOR PREPARING SAME
Filed April 3, 1952
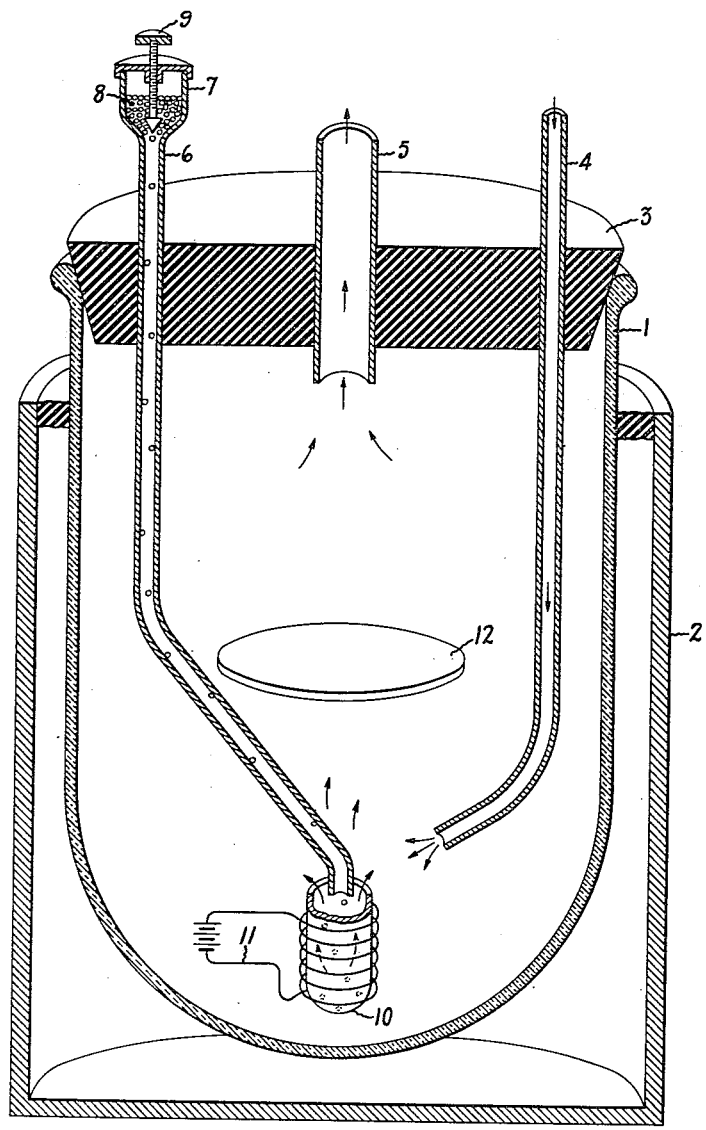
Inventors:
Dominic A. Cusano,
Frank J. Studer,
by Paul A. Frank
Their Attorney.

United States Patent Office 2,789,062
Patented Apr. 16, 1957

2,789,062

TRANSPARENT FLUORIDE LUMINESCENT SCREEN AND METHOD FOR PREPARING SAME

Dominic A. Cusano and Frank J. Studer, Schenectady, N. Y., assignors to General Electric Company, a corporation of New York Application April 3, 1952, Serial No. 280,292

18 Claims. (Cl. 117—33.5)

This invention relates to a transparent luminescent screen which has a long afterglow and offers high resistance to loss in efficiency when subjected to cathode rays. More particularly, it relates to such a screen which contains magnesium fluoride as one of its luminescent substances.

In our copending application, Serial No. 200,908, filed December 15, 1950, and now Patent No. 2,675,331, and assigned to the same assignee as the present application, we disclosed a method whereby transparent luminescent films consisting of the sulfides and selenides of zinc and cadmium may be applied to a glass base. The transparent films disclosed in this copending application do not have long persistence when they are subjected to excitation by cathode rays. Transparent luminescent films having long persistence when subjected to cathode ray excitation may be prepared by evaporating manganese activated zinc fluoride powder onto a glass surface in a vacuum. However, such films deteriorate rapidly when they are subjected to cathode rays and therefore have limited use.

Accordingly, it is an object of this invention to provide a transparent luminescent film having a long afterglow under cathode ray excitation.

It is another object of the invention to provide a luminescent film made up in whole or in part of magnesium fluoride and offering resistance to deterioration when subjected to cathode ray excitation.

Briefly stated, in accordance with one aspect of our invention, we provide a luminescent screen comprising a base of transparent material having a melting point over 500° C. and a transparent film overlying at least a portion of the base, the film being composed of magnesium fluoride, or a composite of zinc-magnesium fluoride activated with manganese. We have found that such a screen may be fabricated by vacuum coating the transparent base material with a thin film of magnesium fluoride, heating the film to a temperature in excess of 400° C. and contacting the heated film with a vapor composed of hydrogen fluoride or ammonium fluoride and manganese halide, or of hydrogen fluoride or ammonium fluoride, zinc, and manganese halide.

The transparent material normally used as the film base is glass. Any glass having a melting point above 400° C., and preferably above 500° C., may be used as a base piece. Quartz is also satisfactory for this purpose and transparent crystals of salts having a melting point above 500° C. may also be used provided they do not react with the magnesium fluoride film.

A coating of magnesium fluoride is evaporated on the base piece by the vacuum coating technique which is so well known in the art that it will not be described here. The thickness of the film is dependent upon the quantity of magnesium fluoride vapor which comes into contact with the base piece. We prefer to restrict the film to less than a micron in thickness since we achieve satisfactory results with such a very thin film. Nevertheless, the film may be thicker than 1 micron without interfering with operations.

The apparatus for carrying out the next step of the present invention may be varied in structure, a typical design or arrangement being shown in the drawing. A treating chamber 1 is surrounded by or placed in a furnace 2 which is heated by a source not shown in the illustration. Alternatively, the chamber 1 may be wrapped with resistance heating wire or other means utilized to heat it to the desired temperature, such means being well known in the art. The upper open end of chamber 1 is sealed with a stopper or plug 3 having holes therein for the passage of a gas supply tube 4, an evacuation tube 5, and a solid material introducing tube or conduit 6. The conduit 6 has a compartment 7 for the storage of material 8 at its upper end as well as a valve device 9 to control the flow of the material down the tube. Toward the lower end of the chamber 1 is located a receptacle or container 10 to receive material from the conduit 6. The container 10, as well as other exposed parts, is preferably composed of Alundum, quartz, or other material which will not react with the materials used. In order that the materials in the container 10 may be vaporized, the latter is heated externally as by an electrical resistance wire 11. A base piece 12 having a surface film of magnesium fluoride is placed above the container 10 and a lower end of the tube 4 with the coated surface facing toward the container 10.

In operation, the furnace 2 or other heating means for the chamber 1 is energized to raise the temperature of the base piece 12 to a point in excess of 40° C. Preferably, the temperature is of the order of 500° C. to 600° C. Higher temperatures may be used but confer no particular benefit.

The material 8 within the compartment 7 is either a manganese halide such as manganese chloride alone or a mixture of zinc powder and manganese halide such as manganese chloride. Optionally, the material 8 may include ammonium fluoride preferably in stoichiometric quantities, but greater or lesser quantities may be used. If ammonium fluoride is present the gas supply tube 4 may be closed off. We prefer to have the manganese halide present in the mixture to the extent of about 10% by weight but greater or lesser proportions of manganese halide will give satisfactory results. When the container 10 is heated to the operating temperature range, the valve 9 is opened to allow the material 8 to drop by gravity into the container 10 where it is vaporized and rises upward as shown by the arrows. If ammonium fluoride is not present in the material 8 hydrogen fluoride is concurrent introduced through the tube 4, the lower end of which is so located, as shown, that the hydrogen fluoride intermingles and mixes with the vapors of zinc and manganese halide. When these vapors contact the magnesium fluoride film on the base piece 12 they react therewith to produce a condensed, continuous, transparent, luminescent film consisting of magnesium fluoride, or zinc-magnesium fluoride activated with manganese. When ammonium fluoride is present in the material 8, hydrogen fluoride may be omitted. In this event the vapors emanating from the container 10 condense in a transparent film on the base piece 12. The chamber is continuously evacuated through the tube 5. A preferred pressure for carrying on the process is 1 millimeter of mercury but satisfactory luminescent films may also be produced at lower or higher pressures.

The proportion of manganese halide initially present in the material 8 may be varied over a wide range, e. g., 1% to 50% by weight, without appreciably affecting the luminescence of the final films produced. For any given charge of material 8, the proportion of manganese finally present in the luminescent film may be controlled by varying the temperature of the container 10 and the temperature of the surface to be coated. As those skilled in the art are aware, a satisfactory luminescent phosphor may be produced by having the manganese activator present in the phosphor in very minute proportions.

A luminescent film prepared in accordance with our invention may be subjected to the action of cathode rays for a long period of time without sustaining any serious damage from burn-out.

While the present invention has been described by reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. A transparent luminescent screen for cathode rays comprising a base of transparent material having a melting point over 400° C., and a transparent film deposited on said base, said film comprising a fluoride selected from the group consisting of magnesium fluoride and zinc-magnesium fluoride, said fluoride being activated with manganese.

2. The method of applying a transparent luminescent film to a glass base which comprises vacuum coating a glass base with a thin film of magnesium fluoride, heating said film to a tempertaure above about 400° C. and contacting said film with a vapor comprising manganese halide, zinc, and a vapor selected from the group consisting of hydrogen fluoride and ammonium fluoride.

3. A method as claimed in claim 2 wherein the manganese halide is manganese chloride.

4. The method of applying a transparent luminescent film to a glass base which comprises vacuum coating a glass base with a thin film of magnesium fluoride, heating said film to a temperature above about 400° C. and contacting said film with a vapor comprising manganese halide, zinc, and a vapor selected from the group consisting of hydrogen fluoride and ammonium fluoride said vapors being at a pressure of the order of 1 mm. of mercury.

5. The method of claim 4 wherein the vapor consists essentially of zinc, hydrogen fluoride, and manganese halide.

6. The method of claim 4 wherein the vapor consists essentially of ammonium fluoride, zinc, and manganese halide.

7. A luminescent screen comprising a glass base, and a transparent film deposited on said base, said film comprising a fluoride selected from the group consisting of magnesium fluoride and zinc-magnesium fluoride, said fluoride being activated with manganese.

8. The method of making a transparent luminescent screen which comprises evaporating a film of magnesium fluoride on a glass base, heating said film to a temperature between 500° C. and 600° C., and contacting the surface of said film with a vapor comprising manganese halide, zinc, and a vapor selected from the group consisting of hydrogen fluoride and ammonium fluoride at a pressure of the order of 1 mm. of mercury.

9. The method of claim 8 wherein the vapor consists essentially of hydrogen fluoride, zinc, and manganese chloride.

10. The method of claim 8 wherein the vapor consists essentially of ammonium fluoride, zinc, and manganese chloride.

11. The method of applying a transparent luminescent film to a glass base which comprises vacuum coating a glass base with a thin film of magnesium fluoride, heating said film to a temperature above about 400° C., and contacting said film with a vapor comprising manganese halide and a vapor selected from the group consisting of hydrogen fluoride and ammonium fluoride.

12. The method as claimed in claim 11 wherein the manganese halide is manganese chloride.

13. The method of applying a transparent luminescent film to a glass base which comprises vacuum coating a glass base with a thin film of magnesium fluoride, heating said film above about 400° C., and contacting said film with a vapor comprising manganese halide and a vapor selected from the group consisting of hydrogen fluoride and ammonium fluoride, said vapors being at a pressure of 1 mm. of mercury.

14. The method of claim 13 wherein the vapor consists essentially of hydrogen fluoride and manganese halide.

15. The method of claim 13 wherein the vapor consists essentially of ammonium fluoride and manganese halide.

16. The method of making a transparent luminescent screen which comprises evaporating a film of magnesium fluoride on a glass base, heating said film to a temperature between 500° C. and 600° C. and contacting the surface of said film with a vapor comprising manganese halide and a vapor selected from the group consisting of hydrogen fluoride and ammonium fluoride at a pressure of the order of 1 mm. of mercury.

17. The method of claim 16 wherein the vapor consists essentially of hydrogen fluoride and manganese chloride.

18. The method of claim 16 wherein the vapor consists essentially of ammonium fluoride and manganese chloride.

References Cited in the file of this patent

UNITED STATES PATENTS

| | | |
|---|---|---|
| 2,462,517 | Leverenz | Feb. 22, 1949 |
| 2,542,122 | Ellefson | Feb. 20, 1951 |